Figures 1, 2:
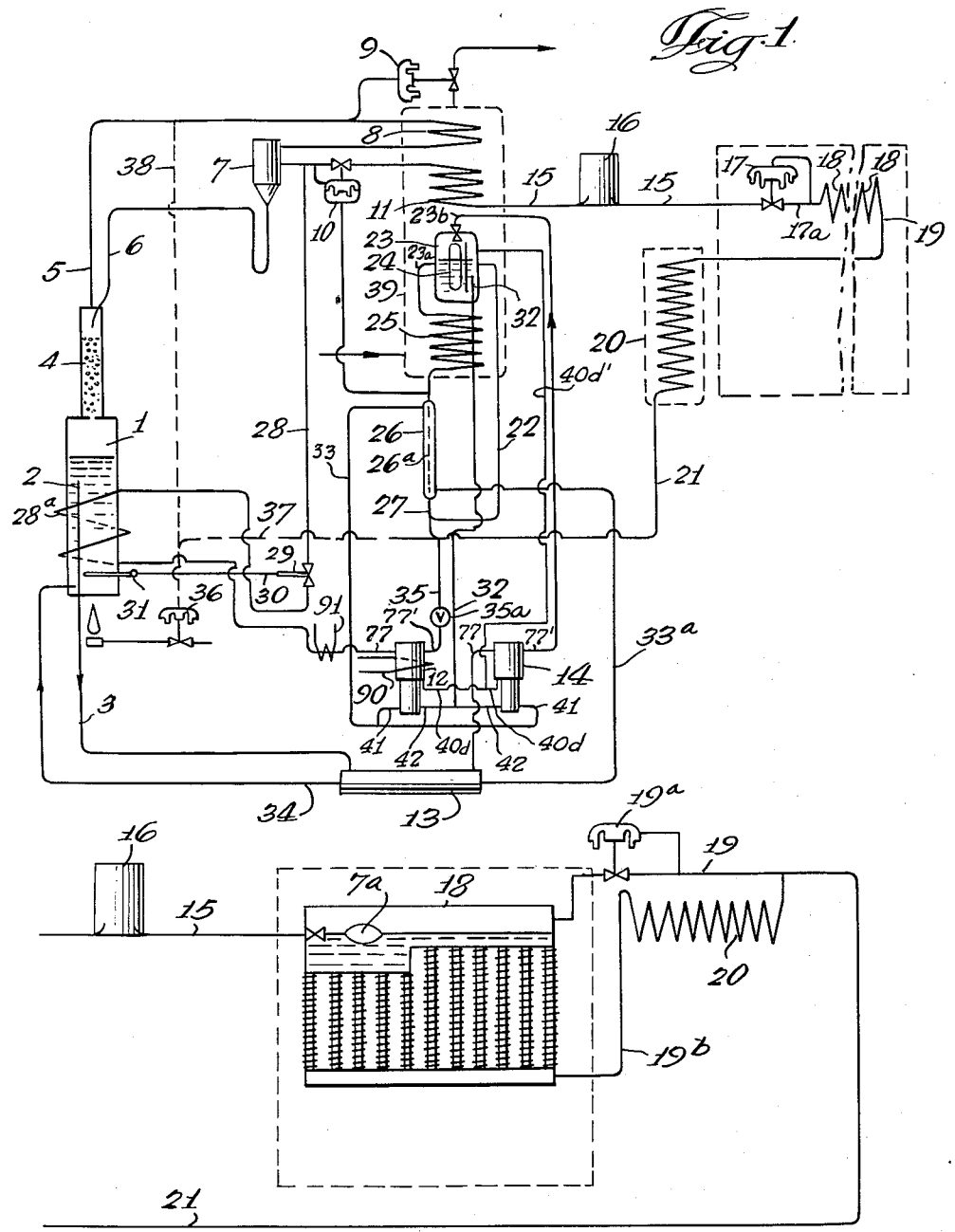

March 22, 1960 H. LANG 2,929,222
ABSORPTION-TYPE HEAT TRANSFER PROCESS AND APPARATUS
Filed June 16, 1955 2 Sheets-Sheet 1

Inventor
Heinrich Lang
By Jules Brady
Attorney

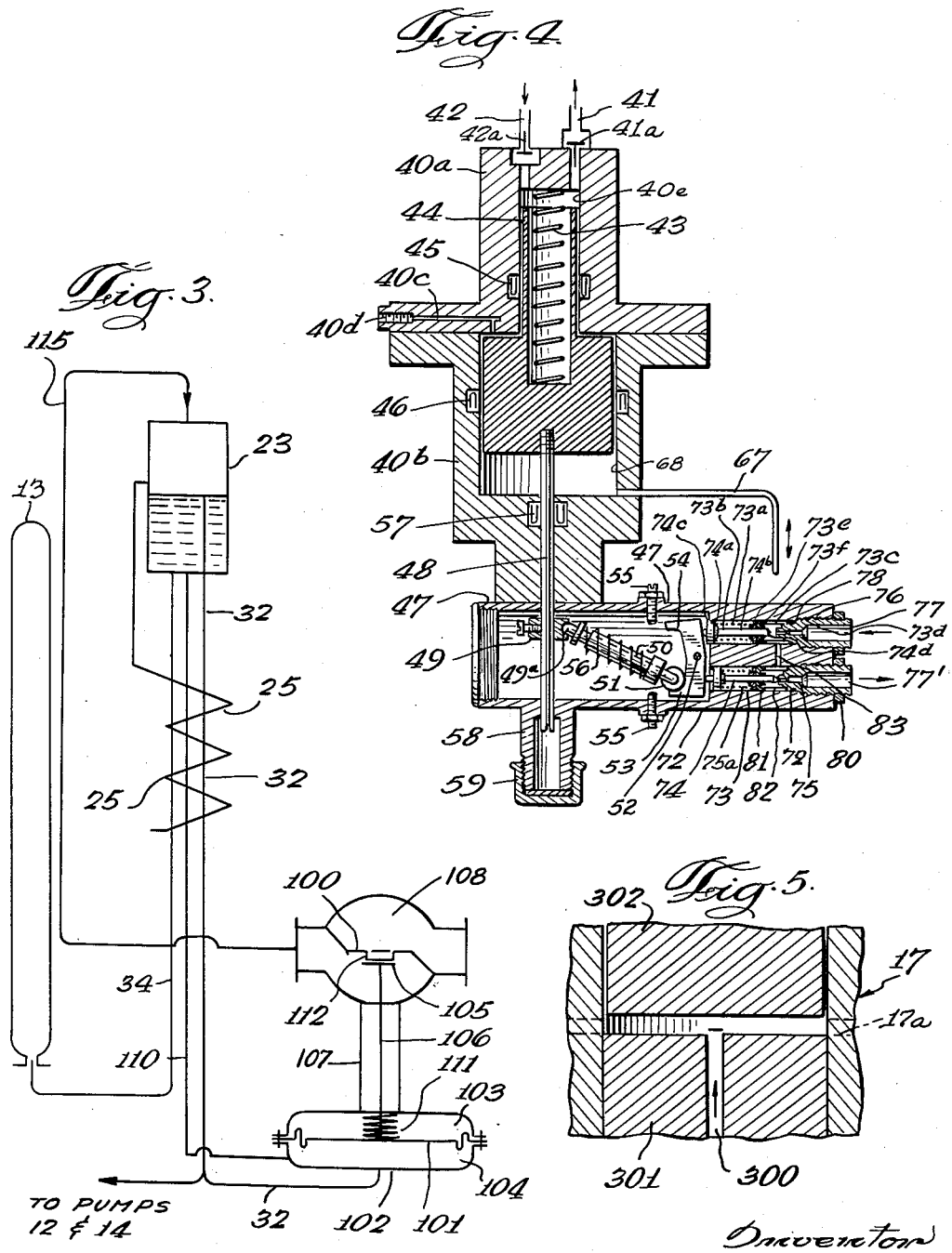

United States Patent Office 2,929,222
Patented Mar. 22, 1960

2,929,222

ABSORPTION-TYPE HEAT TRANSFER PROCESS AND APPARATUS

Heinrich Lang, Frankfurt am Main, Germany, assignor to Borsig Aktiengesellschaft, Berlin-Tegal, Germany Application June 16, 1955, Serial No. 515,998

22 Claims. (Cl. 62—104)

This invention relates to an absorption-type heat transfer process and apparatus.

The objects of the invention will become apparent from the following discussion of some of the problems involved in the operation of absorption-type heat transfer systems.

It has been suggested to use differential piston pumps for conveying the solvent in absorption-type refrigerating machines. For instance, it has been attempted to drive a differential piston pump only with refrigerant vapor to convey the strong solution from the absorber to the generator, whereas the weak solution is supplied to the absorber through a liquid-level controlled regulating valve in dependence on the liquid level in the absorber. According to that suggestion the weak solution, which is under the generator pressure in front of the regulating valve, is reduced in pressure without performing work. Thus energy is lost and the refrigerating power of the plant is reduced.

The known systems employing differential piston pumps have the disadvantage that the refrigerant vapor is not used for driving in a highly concentrated form. Where a relatively high proportion of solvent is contained in the refrigerant vapor, a considerable part of the volume of the driving fluid is lost before the refrigerant vapor performs work; this is due to the temperature drop occurring (cooling losses in conduits and in the working cylinder of the differential piston pump) and the resulting condensation or dissolution of refrigerant.

Another disadvantage resides in the lack of regulation of the solvent circulation, which must be adapted to changing operating conditions. This requirement cannot be fulfilled without an automatic regulating device, which is of special importance because in an absorption refrigerating machine the heat exchanger in the solvent cycle is the component having the highest heat transfer rate and because for each unit of weight of the circulated solution a certain unexchangeable amount of residual heat from the generator is supplied to the absorber.

The energy for the differential piston pump is derived from the pressure difference between generator and absorber. Since the operation of the differential piston pump requires different pressure differences between the generator and absorber, in dependence on the size of the pump, the maintenance of that pressure difference is essential for the continuous operation of the entire process. For instance, when the condenser is very cold all refrigerant vapor may be condensed so that the refrigerant vapor produced in the generator is exhausted before the pressure difference necessary for the operation of the differential piston pump has been reached and the latter cannot start. Such conditions may occur also during the operation of absorption refrigerating machines using differential piston pumps.

The refrigerant vapor may condense in the driving cylinder of the differential piston pumps in amounts which may be considerable and depend on the temperature difference between the condenser temperature (condenser pressure) and the temperature of the cylinder wall of the differential piston pump. This condensation may cause freezing of the differential piston pump and involves a loss in refrigerating efficiency. That condensation also increases the waste heat level. Thus a limit is set for the waste heat, which is undesired unless the waste heat is to be utilized.

Other disadvantages reside in the inadequate enriching of the solution in the absorber and in the fact that an expansion valve for higher pressure differences has not been available. The velocities occurring particularly at high pressure gradients give rise to strong cavitation in the seat and cone of the valve within a short time, even if the cones consist of mineral substances. Besides, in conical valves the highest velocities occur, regardless of the passage cross section, at the point of smallest clearance between the seat and cone and cause a rapid wear particularly of the edges of the seat.

These disadvantages can be avoided by the following measures:

(1) The weak solution flowing back from the generator to the absorber is used for driving a second solvent pump. Thus the solvent pump driven by refrigerant vapor is relieved and refrigerant is saved, which can be used for refrigerating purposes.

(2) The differential piston pump driven by refrigerant vapor is supplied with refrigerant vapor taken between the dephlegmator and condenser so that refrigerant vapor of the highest concentration is used for performing work in the differential piston pump.

(3) An automatic regulation is suggested for the solvent circulation. A proportional-action controller, having a proportional band of different size, depending on the mode of operation of the refrigerating plant, or an integral-action controller, controls the circulation rate of the solvent in dependence on the generator temperature or heat output. If properly dimensioned this enables an automatic regulation of the solvent circulation as required by the heat output in spite of changing conditions of operation.

(4) Since the operation of an absorption refrigerating machine whose solvent circulation is maintained by a differential piston pump depends on the formation or presence of a sufficient pressure difference between generator and absorber, a differential pressure valve is provided between the dephlegmator and condenser to shut off the flow of refrigerant to the condenser unless a predetermined pressure difference exists between the generator and absorber.

(5) To avoid a condensation of refrigerant vapor in the driving cylinder of the differential piston pump, the refrigerant vapor is expanded in the pipe leading to the cylinder. Since the vapor volume is inversely related to the vapor pressure, this will not substantially alter the efficiency of the differential piston pump operating almost on the principle of a full-pressure machine, whereas the dew point of the refrigerant vapor used for driving the differential piston pump may be reduced considerably in the driving-fluid cylinder of the pump, depending on the dimensions selected. For instance, the generator may be operated at a pressure of 20 kg./sq. cm. (absolute), corresponding to a condensation temperature of plus 50 deg. C., without condensation in the driving-fluid cylinder, even though the cylinder wall temperature may be as low as or below plus 20 deg. C.

(6) The provision of a circulation of solution in the absorber to increase the enriching effect.

(7) The provision of an expansion valve in which the expansion takes place in a larger space.

(8) The introduction of a level controller operating on an auxiliary controlled variable for regulating the liquid level in the generator.

The invention provides the following improvements in an absorption-type heat transfer process which comprises conveying strong solution from an absorber to a generator by a stream of fresh refrigerant vapor flowing from said generator to said absorber:

(a) The stream of refrigerant vapor used to convey said solution is throttled increasingly with a drop of the temperature in the generator.

(b) The refrigerant vapor is rectified before it is used to convey said strong solution.

(c) The refrigerant vapor is expanded before it is used to convey said strong solution.

(d) the refrigerant vapor is superheated before it is used to convey said strong solution.

(e) Where the refrigerant is conducted from said generator to said absorber in a second stream parallel to said first one, for heat transfer purposes, said second stream is maintained interrupted as long as the pressure difference between the generator and absorber is below a predetermined limit and said second stream is caused to flow as long as said pressure difference exceeds said limit. The reason for this step is that the circulating solution is a multiple of the inflowing weak solution so that the degree of absorption is increased considerably.

(f) Where the refrigerant is condensed and then evaporated in said second stream, evaporated refrigerant is throttled and together with unevaporated refrigerant is supplied to the absorber. This provides for a circulation and promotes the enrichment of the solution in the absorber.

(g) Where the refrigerant is condensed and then evaporated in said second stream, the stream of refrigerant vapor used to convey said solution and evaporated refrigerant from said second stream are jointly fed to the absorber from below and the solution is circulated in said absorber.

(h) Where the refrigerant is condensed and then evaporated in said second stream, condensed refrigerant is throttled in dependence on the pressure in the absorber before said condensed refrigerant is evaporated.

(i) Where the strong solution is conveyed from the absorber to the generator by a differential piston pump, additional heat is supplied to the drive side of said pump.

The invention further provides the following improvements in absorption-type heat transfer apparatus for carrying out this process, which comprises a differential piston pump arranged to be driven by said stream of refrigerant vapor to convey said strong solution.

(k) The provision of a variable throttle for controlling the flow of refrigerant vapor to said pump in response to the generator temperature.

(l) The provision of a dephlegmator arranged in the path of the refrigerant vapor from the generator to the pump.

(m) The provision of expending means arranged in the path of the refrigerant vapor from the generator to the pump.

(n) The provision of a valve arranged to shut off said second stream when the pressure difference between the generator and absorber drops below said limit.

(o) The provision of a main evaporator having an inlet for receiving condensed refrigerant, a liquid refrigerant outlet and a refrigerant vapor outlet, a valve connected between the refrigerant vapor outlet of the main evaporator and the absorber and responsive to the pressure on the absorber side of the valve, and a second evaporator connected between the liquid refrigerant outlet of the main evaporator and the absorber.

Additional features of the invention relating to the construction of parts of the apparatus will become apparent as the specification proceeds.

Illustrative embodiments of the invention are shown in the accompanying drawings, in which:

Fig. 1 is a flow scheme of apparatus embodying the invention,

Fig. 2 is a diagrammatical detail illustrating a modification of the apparatus shown in Fig. 1, Fig. 3 shows a modified control valve arrangement for the solvent circulation, Fig. 4 is a sectional view of a differential piston pump employed in apparatus as shown in Fig. 1 or in conjunction with the modifications thereof shown in Figs. 2 or 3, and Fig. 5 shows a preferred expansion valve employed in the apparatus.

Referring to Fig. 1, 1 is a generator, 2 a standpipe preventing a drop of the liquid extracted through pipe 3 below a certain level under abnormal operating conditions. 4 is a rectifier, 5 a connecting pipe leading to the dephlegmator 8, and pipe 6 conducts condensate from the trap 7, supplied from dephlegmator 8, to rectifier 4. Refrigerant vapor freed from solvent passes from trap 7 through the differential pressure valve 10 to the condenser 11, where it is liquefied and delivers its heat of condensation. The refrigerant liquefied in the condenser flows through pipe 15, receiver 16, throttle or expansion valve 17 to the main evaporator 18 and thereafter to a second evaporator 20 or direct to the absorber 23.

In the modification of Fig. 2 a tank-type or flooded evaporator 18 is used and the expansion valve 17 is replaced by a float valve 7a, which controls the liquid level in the evaporator 18. The pipe 19 contains a pressure controlled valve 19a, which gradually closes the pipe 19 as the pressure drops in the vessel 23, Fig. 1. Thus the pressure in the evaporator 18 is increased relative to the absorber pressure if the latter drops, because the heat flow to the evaporator 18 continues, and refrigerant is lifted through pipe 19b into an auxiliary evaporator 20, which may be used, e.g., for making ice, and from which the refrigerant passes as vapor or liquid through pipe 21 to the absorber 23. Thus the concentration of refrigerant in the absorber 23 is prevented from dropping below a certain value. Besides that process initiates an automatic regeneration of the contents of the evaporator to return any entrained solvent to the solvent cycle.

Again referring to Fig. 1 the differential pressure valve 10 opens the flow of refrigerant to the condenser when a certain minimum pressure exists between the generator and absorber. Thus the dephlegmator 8 will always be at a higher temperature than the condenser 11. The pressure difference built up ensures that sufficient operating pressure is available to drive the two differential piston pumps 12 and 14 before refrigerant vapor can pass from the generator to the condenser and refrigerating part. Upon a decrease of the pressure difference between generator and absorber, particularly when the differential piston pumps are at a standstill, the refrigerant in the generator serves only for transferring heat to the dephlegmator 8. Only when a sufficient temperature has been reached there and strong solution is conveyed by the differential piston pumps 12 and 14 to the generator does the differential pressure valve 10 open up the flow of refrigerant to the condenser.

The driving fluid inlet 77 of the differential piston pump 12 is connected through pipe 28 to the vapor outlet of trap 7 in front of the differential pressure valve 10. Thus a highly concentrated refrigerant vapor is obtained for driving the pump 12. Line 28 incorporates a variable throttle 29, which is connected through a control line 30 to the temperature feeler 31 to control the flow of vapor to the differential piston pump 12 in dependence on the generator temperature.

The refrigerant vapor is expanded before it is fed to the differential piston pump 12. This may be effected by a variable throttle 29 or by a second throttle (not shown) which is arranged behind the variable throttle. The degree of expansion required depends on the dimensions of the differential piston pump 12 and may be determined in accordance with the operating conditions. An additional throttle 35a may be arranged in pipe 35 and may be adjusted to control the vapor outflow from the pump. Thus the frequency of the differential piston pump 12 may be influenced as well as its efficiency as regards the consumption of refrigerant. If that last-mentioned throttle is correctly adjusted, the dead-center volume or clearance space of the differential piston pump 12 is under a residual pressure which corresponds to the initial stress of the return spring 43 (Figure 4), whereby the charge required for the next following working stroke of the differential piston pump is favorably influenced.

The driving fluid inlet of the differential pump 14 is connected to receive weak solution from generator 1 through standpipe 2, pipe 3 and heat exchanger 13.

The absorber comprises the collecting or equalizing vessel 23 containing an absorber solution inlet at the top end of conduit 22, which leads through the heat exchanger 26 to the heat exchange coil 25 discharging through an absorber solution outlet 23a in the equalizing vessel 23. Before the heat exchanger 26 a nozzle or injector 27 is provided at the bottom of conduit 22 to receive refrigerant vapor and/or liquid from evaporators 18 and 20 through pipe 21 and to receive refrigerant vapor from the driving fluid outlet 77' of pump 12 through line 35, and to inject said refrigerant into the conduit 22. The refrigerant injected at 27 causes a circulation of strong solution from an equalizing vessel 23 through conduit 22 past nozzle 27 and through heat exchanger 26 and coil 25 back into vessel 23.

The absorber also comprises a standpipe 32 forming a strong solution outlet and connected to the differential piston pumps 12 and 14, which are arranged in parallel with respect to that standpipe and convey the strong solution extracted through pipe 32 to the heat exchanger 26 by way of pipe 33. In the heat exchanger 26, the strong solution from pumps 12 and 14 receives heat of absorption from the counterflowing strong solution which carries the refrigerant injected at 27.

The dephlegmator 8, condenser 11, equalizing vessel 23 and heat exchange coil 25 are arranged in a common fluid chamber or water reservoir 39, which may serve as a boiler for heating water. A pressure controlled fluid valve 9 may be responsive to the pressure in pipe 5 to start the flow of fluid or water through reservoir 39 when the condenser pressure exceeds a certain, adjustable value. Instead of being flown through by water, the fluid chamber 39 may be arranged for being flown through by another fluid, such as air.

From the heat exchanger 26 the strong solution conveyed by the pumps 12 and 14 flows through line 33a to the heat exchanger 13, where it is heated by the weak solution from generator 1, and then through line 34 to generator 1.

As strong solution is extracted from vessel 23 through pipe 32 the liquid level in the vessel 23 drops until the float valve 24 opens the weak solution inlet 23b to the vessel 23 to permit weak solution from the driving fluid outlet of pump 14 to flow into the vessel 23. The float valve 24 closes when the liquid in the vessel 23 has reached a predetermined level.

According to Fig. 3 the float valve in the absorber 23 may be replaced by a level control valve 100 connected in line 3 for controlling the flow of weak solution from the generator 1 in dependence on the liquid level therein. The valve 100 is controlled by a diaphragm 101, which divides the diaphragm casing 102 into an upper chamber 103 and a lower chamber 104. The diaphragm 101 is connected to the valve member 105 by a valve spindle 106 disposed in a conduit 107, which provides communication between the inlet side 108 of the valve body and the upper chamber 103 of the diaphragm casing 102. The lower chamber 104 of the diaphragm casing 102 is connected through a reference pipe 110 to the bottom of absorber 23. A compression spring 111 is held between the diaphragm 101 and the top of the diaphragm casing 102 to bias through the diaphragm 101 and valve spindle 106 the valve 100 in the opening sense. Thus the valve member 105 will be held from its seat 112 as long as the liquid level in the generator 1 is higher than the top of standpipe 2; then the same pressure is exercised on both sides of the diaphragm through pipes 2, 107 and reference pipe 110, respectively. If the liquid level in the generator 1 drops below the top of the standpipe 2, the weak solution in the pipe 2, 3 will continue to flow through the open valve 100 and pipe 115 to absorber 23 until the difference between the heads of liquid in pipes 110 and 2 is sufficient to close the valve against the force of spring 111.

Whereas the circulation of solvent is controlled by the throttle 29 in dependence on the generator temperature, the apparatus as a whole is regulated by controlling the supply of fuel to the combustion chamber of the generator or generally by controlling heating means for the generator in dependence on the variable which is considered most significant under given operating conditions. For instance, where the preparation of hot water is considered most important the fuel supply may be controlled in dependence on the water temperature. Alternatively warm water may have to be prepared only at a rate corresponding to the refrigerating requirements.

(a) The fuel supply is controlled in dependence on the absorber pressure or on the temperature of the cooling chamber by way of a regulating valve 36, which may be connected through a control or impulse line 37 to the absorber. If only refrigeration is required, the water heated in the reservoir 39 is discharged through regulating valve 9, which may be responsive to the condenser pressure or to the temperature of the water heated in the reservoir.

(b) The fuel supply is controlled in dependence on the warm water temperature in boiler 39. The regulating valve 36 is connected through control or impulse line 38 to pipe 5, whose ammonia pressure can be considered a measure of the water temperature.

(c) The fuel supply is controlled in dependence on the refrigeration and heat requirements of the plant, the regulating valve 36 being closed when the temperature of the medium to be cooled by the evaporator 18 and the water in the reservoir 39 are below and above predetermined limits, respectively.

(d) The regulating valve 36 is arranged to be opened by an impulse transmitted through line 37 and to be closed by an impulse transmitted through line 38 when a certain condenser pressure has been reached.

The plant may be operated with only one differential piston pump. In that case the differential piston pump 14 is eliminated so that the weak solution passes to the absorber past the float valve 24 without performing work. When such plants are arranged to be coal-fired, it is suggested to incorporate a draft control which in dependence on the generator temperature operates a known damper, as is usual in heating plants.

According to Fig. 4 the differential piston pumps 12 and 14 shown in Fig. 1, operating in dependence on a liquid level, comprise a bipartite casing 40a, 40b. The casing 40a containing the smaller cylinder bore 40e serves as a working cylinder for conveying strong solution by way of non-return valves, 41a and 42a which prevent inflow at the outlet 41 and outflow at the inlet 42, respectively. A return spring 43 returns the differential piston 44 into its lower dead center position after the piston has performed its stroke. The differential piston 44 is sealed in the cylinder bores of casing parts 40a and 40b by packing cups 45 and 46, respectively. The supply of driving fluid to the differential piston is controlled automatically in dependence on the piston 44 reaching its upper and lower dead centers. The control mechanism is accommodated in a tubular casing 47. Extending transversely through the casing 47 the piston rod 48 may be rotatably connected to the driving-fluid end of piston 44 and carries a driver 49 formed with a lateral socket 49a. The socket 49a receives one end of a longitudinally resilient control lever 50, which carries at its other end a slide roller 51 bearing against the two-armed rocker 53 pivoted at 52. That rocker is formed with a symmetrical cam face 54 facing the control lever 50 and having a central portion formed according to an arc of a circle having its center on the axis of symmetry of cam face 54, and two opposite end portions formed according to the chord of said arc. At both ends of the rocker 53, projections are provided to prevent the roller 51 from moving off the cam face 54.

When the differential piston 44 moves downwardly from the position shown in Fig. 4, the roller 51 will remain at the lower end of rocker 53 until the lever 50 engages the lower one of the two adjustable stops 55 provided at the top and bottom of the path of the lever on the wall of casing 47. Upon engagement of lever 50 with either of said stops 55, the roller 51 will be displaced along cam face 54 to the opposite end of rocker 53, which end is thus urged away from the piston rod 48. The stops 55 may be adjusted to set the stroke of the differential piston 44. The work required for shifting the rocker 53 is performed by the spring 56, which is incorporated in lever 50 to be strained during a piston movement. The piston rod 48 is sealed against the control casing 47 by a packing cup 57. The counterbearing 58 is closed by the cap 59 so that an oil level can be maintained in the control casing 47.

The end of casing 47 adjacent to the valve rocker 53 is formed as a block 72 having two bores 73. Each bore 73 consists of an upper part 73a, a constriction 73b, a central part 73c, and a threaded lower part 73d. In each bore 73 a valve plunger 74 is slidable, which comprises a disk 74a fitting the upper bore part 73a, a rod 74b fitting the constriction 73b, and a top extension 74c above the disk 74a; that extension 74c may be integral with the rod 74b. At its lower end each rod 74b has the form of a flat cone 74d. Above and below the constriction 73b each bore 73 is formed with abutment faces 73e and 73f, respectively. Compression springs 75a are inserted between the undersides of disks 74a and the upper abutment faces 73e of the respective bores to urge the extensions 74c against the rocker 53 on both sides of the pivot 52. Thus the plungers 74 are mutually pressure-relieved. The lower part 73d of each bore 73 receives a seat member 75 formed on its lower part with an external thread in engagement with a thread 76 of the bore part 73d. Each seat member 75 is formed with a through bore, designated 77 or 77'. The upper part of each seat member is formed with a peripheral groove 78 receiving an O-ring 79 sealing against the bore 73.

The seat members 75 are axially adjustable in the bores 73 owing to their threaded engagement therewith. They protrude below the bores 73 and a lock nut 80 is screwed on the downwardly protruding portion of each seat member 75 to engage the underside of the block 72 and thus lock the seat member 75 in its adjusted position.

The central part 73c of each bore 73 receives a packing cup 81 fitting around the plunger rod 74b and engageable by the lower abutment face 73f of the bore. A spacer ring 82 is inserted in the central part 73c of each bore 73 between the packing cup 81 and the upper end of the seat member 75.

The central parts 73c of bores 73 communicate with each other through a duct 83, which is connected through a line 67 to the cylinder bore 68 of the casing part 40b of the differential piston pump.

The valve rocket 53 is adapted to urge either of plungers 74 with their conical lower ends 74d against the upper rim of the respective seat member bore 77 or 77' whereas the respective other plunger 74 is lifted from the other seat member bore to connect the same through duct 83 and line 67 to the cylinder 68.

Bore 77 is connected to a source of fresh driving fluid, as pipe 28 (pump 12, Fig. 1) or generator 1 (pump 14, Fig. 1), bore 77' to means for receiving spent driving fluid, as absorber 23. Thus, in dependence on the position of the differential piston 44, valve rocker 53 and plungers 74, the cylinder bore 68 will either receive fresh driving fluid from bore 77 during the working stroke of the differential piston 44, or will discharge spent driving fluid through bore 77' during the return stroke of the differential piston 44.

The differential face between the driving and driven ends of the differential piston is connected through the bore 40c of casing part 40a to the connection 40d, which may be connected through pipe 40d' to the absorber to relieve the differential face of the differential piston. Depending on the operating conditions this arrangement permits the use of a weaker return spring 43.

This differential pump may be used also for other applications where pressure is to be transformed or the pressure of a working fluid is to be transmitted to the cycle of a second fluid.

The tendency of the refrigerant vapor from dephlegmator 8 to condense in the differential piston pump can be further reduced by supplying the drive side of the pump (casing 40b) with sufficient heat to maintain the temperature in the casing above a predetermined value, as by supplying heat through coil 90. In a preferred mode of carrying out the invention the refrigerant vapor is superheated between the trap 7 and the differential piston pump 12 to supply the pump casing 40b with sufficient heat as indicated above. This may be done by including a coil 28a, associated with generator 1, in line 28; or by supplying heat to a coil 91.

Other means for supplying heat to the differential pump directly or for superheating the refrigerant vapor need not be described because various means will be obvious to those skilled in the art. The heat may be extracted from another part of the heat transfer apparatus.

With reference to Fig. 5 the expansion valve 17 is contained in a chamber (not shown) connected to the refrigerant inlet of the evaporator 18 and containing two members 301, 302 having parallel circular faces facing each other. Members 301, 302 are subject to a force urging them towards each other. Member 301 has a central bore 300 adapted to be closed by member 302 and connected to line 15 for receiving condensed refrigerant under a pressure which may be sufficient to space the members 301, 302 apart and thus create an expansion space between them.

In the present embodiment the member 302 is urged against member 301 by the outlet pressure of the valve. Thus the valve 17 operates in dependence on a pressure difference between the inlet and outlet pressures. Since the outlet 17a of the valve 17 is exposed through the evaporator 18 or 20 to the pressure in the absorber 23, the admission of refrigerant to the evaporator is thus throttled in dependence on the pressure in the absorber 23.

In the operation of that valve the expansion takes place at a substantially uniform velocity, which is much lower than in the known conical expansion valves. As the radial distance from the central bore 300 increases the expansion volume can increase considerably without a change in velocity because there is a square relation between the distance of travel and the volume of a fluid expanding between members 301, 302.

What I claim is:

1. In an absorption-type heat transfer process which comprises heating strong solution in a generating zone to produce fresh refrigerant vapor and weak solution, returning said weak solution to an absorbing zone, recycling spent refrigerant to said absorbing zone to produce strong solution, conducting said fresh refrigerant vapor continuously in a first stream used to convey strong solution thus produced to said generating zone, and conducting said fresh refrigerant vapor for heat transfer purposes in a second stream parallel to the first one, the step of throttling said first stream increasingly with a drop of the temperature in said generating zone.

2. In absorption-type heat transfer apparatus comprising a refrigerant vapor generator having a vapor outlet, a solution inlet and a solution outlet, an absorber having a solution inlet connected to the generator solution outlet, a solution outlet, and a spent refrigerant inlet, pump means for conveying solution from said absorber solution outlet to said generator solution inlet, said pump means having a driving fluid inlet connected to said generator vapor outlet and a driving fluid outlet connected to said spent refrigerant inlet, a condenser having an inlet connected to said generator vapor outlet and an outlet, evaporator means having an inlet connected to said condenser outlet and an outlet connected to said spent refrigerant inlet, and a variable throttle responsive to the temperature in the generator and connected between said generator vapor outlet and the driving fluid inlet of said pump.

3. In absorption-type heat transfer apparatus comprising a series arrangement of a condenser, evaporator and absorber, the provision of an expansion valve connected between said condenser and evaporator and comprising a chamber connected to the evaporator and containing two members having parallel circular faces facing each other, one of which members has a circular bore opening centrally in said circular face and adapted to receive condensed refrigerant from said condenser, the other of said members being exposed to the pressure in the evaporator tending to urge said other member against said one member to close said bore, said other member being adapted to lift from said bore responsive to the pressure difference between the condenser and evaporator to provide an expansion space between said two members.

4. In absorption-type heat transfer apparatus comprising a refrigerant vapor generator having a driving fluid outlet and a driven fluid inlet, an absorber having a driving fluid inlet and a driven fluid outlet, a pump having a differential piston arranged to be driven by driving fluid from said generator driving fluid outlet to convey driven fluid from said absorber driven fluid outlet to said generator driven fluid inlet, and means operable to connect said piston alternatively to said generator driving fluid outlet and to the absorber driving fluid inlet, said differential piston having a larger diametral portion exposable to said driving fluid inlet and outlet and a smaller diametral portion exposable to said driven fluid inlet and outlet, said piston being formed with a radial annular differential face between said larger and smaller diametral portions, the provision of means providing communication between said differential face and the absorber.

5. An absorption-type heat transfer apparatus comprising a refrigerant vapor generator having a vapor outlet, a solution inlet and a solution outlet, an absorber having a solution inlet connected to the generator solution outlet, a solution outlet and a spent refrigerant inlet, pump means for conveying solution from said absorber solution outlet to said generator solution inlet, said pump means having a driving fluid inlet connected to said generator vapor outlet and a driving fluid outlet connected to said spent refrigerant inlet, a condenser having an inlet connected to said generator vapor outlet and an outlet, evaporator means having an inlet connected to said condenser outlet and an outlet connected to said spent refrigerant inlet, heating means for said generator, a variable throttle responsive to the temperature in the generator and connected between said generator vapor outlet and the driving fluid inlet of said pump means, and means for controlling said heating means in response to an operating condition of said apparatus.

6. An absorption-type heat transfer apparatus comprising a refrigerant vapor generator having a vapor outlet, a solution inlet and a solution outlet, an absorber having a solution inlet connected to the generator solution outlet, a solution outlet and a spent refrigerant inlet, pump means for conveying solution from said absorber solution outlet to said generator solution inlet, said pump means having a driving fluid inlet connected to said generator vapor outlet and a driving fluid outlet connected to said spent refrigerant inlet, a condenser having an inlet connected to said generator vapor outlet and an outlet, a cooling zone including evaporator means having an inlet connected to said condenser outlet and an outlet connected to said spent refrigerant inlet, heating means for said generator, a variable throttle responsive to the temperature in the generator and connected between said generator vapor outlet and the driving fluid inlet of said pump means, means for controlling said heating means in response to a condition in said cooling zone to maintain the temperature in said zone below a predetermined maximum.

7. An absorption-type heat transfer apparatus comprising a refrigerant vapor generator having a vapor outlet, a solution inlet and a solution outlet, an absorber having a solution inlet connected to the generator solution outlet, a solution outlet and a spent refrigerant inlet, pump means for conveying solution from said absorber solution outlet to said generator solution inlet, said pump means having a driving fluid inlet connected to said generator vapor outlet and a driving fluid outlet connected to said spent refrigerant inlet, a condenser having an inlet connected to said generator vapor outlet and an outlet, a cooling zone including evaporator means having an inlet connected to said condenser outlet and an outlet connected to said spent refrigerant inlet, a cooling chamber arranged for the flow therethrough of a cooling fluid and having said condenser therein, heating means for said generator, a variable throttle responsive to the temperature in the generator and connected between said generator vapor outlet and the driving fluid inlet of said pump means, and means for controlling said heating means in response to operating conditions in said cooling chamber and said cooling zone to maintain the temperature of the fluid flowing through the cooling chamber and the temperature of the cooling zone above and below predetermined limits, respectively.

8. An absorption-type heat transfer process which comprises heating strong solution in a generating zone to produce fresh refrigerant vapor and weak solution, returning said weak solution to an absorbing zone recycling spent refrigerant to said absorbing zone to produce strong solution, conducting said fresh refrigerant vapor continuously in a first stream used to convey strong solution thus produced to said generating zone, conducting said fresh refrigerant vapor for heat transfer purposes in a second stream parallel to the first one, and modifying the temperature-pressure relationship of the fresh refrigerant vapor in said first stream to prevent condensation of said vapor as it is used to convey strong solution.

9. An absorption-type heat transfer apparatus comprising a refrigerant vapor generator having a vapor outlet, a solution inlet and a solution outlet, an absorber having a solution inlet connected to the generator solution outlet, a solution outlet and a spent refrigerant inlet, piston driven pump means for conveying solution from said absorber solution outlet to said generator solution inlet, said pump means having a driving fluid inlet connected to said generator vapor outlet and a driving fluid outlet connected to said spent refrigerant inlet, a condenser having an inlet connected to said generator vapor outlet and an outlet, evaporator means having an inlet connected to said condenser outlet and an outlet connected to said spent refrigerant inlet, and means between said generator vapor outlet and said pump for expanding the refrigerant vapor used to drive said pump.

10. An absorption-type heat transfer apparatus comprising a refrigerant vapor generator having a vapor outlet, a solution inlet and a solution outlet, an absorber having a solution inlet connected to the generator solution outlet, a solution outlet and a spent refrigerant inlet, piston driven pump means for conveying solution from said absorber solution outlet to said generator solution inlet, said pump means having a driving fluid inlet connected to said generator vapor outlet and a driving fluid outlet connected to said spent refrigerant inlet, a condenser having an inlet connected to said generator vapor outlet and an outlet, evaporator means having an inlet connected to said condenser outlet and an outlet connected to said spent refrigerant inlet, and means between said generator vapor outlet and the driving fluid outlet of said pump for raising the temperature of the refrigerant vapor used to drive said pump.

11. An absorption-type heat transfer apparatus comprising a refrigerant vapor generator having a vapor outlet, a solution inlet and a solution outlet, an absorber having a solution inlet connected to the generator solution outlet, a solution outlet and a spent refrigerant inlet, piston driven pump means for conveying solution from said absorber solution outlet to said generator solution inlet, said pump means having a driving fluid inlet connected to said generator vapor outlet and a driving fluid outlet connected to said spent refrigerant inlet, a condenser having an inlet connected to said generator vapor outlet and an outlet, evaporator means having an inlet connected to said condenser outlet and an outlet connected to said spent refrigerant inlet, and a throttle valve between the driving fluid outlet of said piston pump means and said spent refrigerant inlet to control the exhaust pressure of said pump.

12. In an absorber for absorption-type heat transfer apparatus, the combination of an equalizing vessel having a weak solution inlet and a strong solution outlet, a conduit having both an inlet and an outlet connected to said equalizing vessel, heat exchange means associated with said conduit intermediate said inlet and outlet, and a spent refrigerant injector associated with said conduit intermediate the conduit inlet and said heat exchange means to inject spent refrigerant into said conduit to pass through said heat exchange means and the conduit outlet to draw solution from said vessel through the inlet into said conduit.

13. An absorber of the character described in claim 12 wherein said heat exchange means includes a heat exchanger arranged to conduct strong solution from the strong solution outlet in a countercurrent to the flow in said conduit from said injector to said conduit outlet, and a portion of said conduit between said heat exchanger and said outlet, located in a cooling chamber arranged for the flow therethrough of a cooling fluid.

14. In an absorber for absorption-type heat transfer apparatus, the combination of an equalizing vessel having a weak solution inlet and a strong solution outlet, a conduit having both an inlet and an outlet connected to said equalizing vessel, heat exchange means associated with said conduit intermediate said inlet and outlet, a heat exchanger associated with said conduit intermediate the inlet and outlet thereof and arranged to conduct solution from said strong solution outlet in a countercurrent to the flow in said conduit, a cooling chamber arranged for the flow therethrough of a cooling fluid and having a portion of said conduit located therein, and a spent refrigerant injector connected to said conduit to inject spent refrigerant into said conduit and to draw solution from said utilizing vessel through the conduit.

15. An absorption-type heat transfer apparatus comprising a refrigerant vapor generator having a vapor outlet, a solution inlet and a solution outlet, an absorber having a solution inlet connected to the generator solution outlet, a solution outlet, and a spent refrigerant inlet, piston driven pump means for conveying solution from said absorber solution outlet to said generator solution inlet, said pump means having a driving fluid inlet connected to said generator vapor outlet and a driving fluid outlet connected to said spent refrigerant inlet, a condenser having an inlet connected to said generator vapor outlet and an outlet, evaporator means having an inlet connected to said condenser outlet and an outlet connected to said spent refrigerant inlet, and means connected between the generator vapor outlet and said driving fluid inlet for removing solvent vapor from the refrigerant vapor used to drive said pump.

16. An absorption-type heat transfer apparatus comprising a refrigerant vapor generator having a vapor outlet, a solution inlet and a solution outlet, an absorber having a solution inlet connected to the generator solution outlet, a solution outlet, and a spent refrigerant inlet, means for removing solvent vapor from said refrigerant vapor having an inlet connected to said generator vapor outlet and an outlet, piston driven pump means for conveying solution from said absorber outlet to said generator solution inlet, said pump means having a driving fluid inlet and a driving fluid outlet connected to said spent refrigerant inlet, a conduit having an inlet connected to the outlet of said solvent vapor removing means and an outlet connected to the driving fluid inlet of said pump means, a condenser having an inlet connected to the outlet of said solvent vapor removing means and an outlet, evaporator means having an inlet connected to said condenser outlet and an outlet connected to said spent refrigerant inlet, and a valve connected between the inlet of said conduit and the inlet of said condenser, and responsive to the pressure difference between the generator and absorber for preventing flow of refrigerant vapor to said condenser when said pressure difference is below a predetermined value.

17. In an absorption-type heat transfer apparatus, refrigerant vapor generator means having a vapor outlet, a solution inlet and a solution outlet, absorber means having a solution inlet connected to the generator solution outlet, a solution outlet and a spent refrigerant inlet, a condenser having an inlet connected to the vapor outlet of said generator means and an outlet, an evaporator having an inlet connected to said condenser outlet and an outlet connected to said spent refrigerant inlet, continuously operating first pump means for conveying solution from said absorber solution outlet to said generator solution inlet, said pump means having a driving fluid inlet connected to the vapor outlet of said generator means and a driving fluid outlet connected to said spent refrigerant inlet, intermittently operating second pump means for conveying solution from said absorber solution outlet to said generator solution inlet, said second pump means having a driving fluid inlet connected to the solution outlet of said generator means and a driving fluid outlet connected to the solution inlet of said absorber means, and means for controlling the operation of said second pump as a function of the level of solution in one of said generator and absorber means.

18. Apparatus of the character described in claim 17, including a valve in the driving fluid connection of said second pump means, remote from both said generator and absorber means, and control means for said valve operable as a function of the level of solution in one of said generator and absorber means.

19. In an absorption-type heat transfer apparatus, refrigerant vapor generator means having a vapor outlet, a solution inlet and a solution outlet, absorber means having a solution inlet connected to the generator solution outlet, a solution outlet and a spent refrigerant inlet, a condenser having an inlet connected to the vapor outlet of said generator means and an outlet, an evaporator having an inlet connected to said condenser outlet and an outlet connected to said spent refrigerant inlet, continuously operating first pump means for conveying solution from said absorber solution outlet to said generator solution inlet, said pump means having a driving fluid inlet connected to the vapor outlet of said generator means and a driving fluid outlet connected to said spent refrigerant inlet, intermittently operating second pump means for conveying solution from said absorber solution outlet to said generator solution inlet, said second pump means having a driving fluid inlet connected to the solution outlet of said generator means and a driving fluid outlet connected to the solution inlet of said absorber means, a valve in the driving fluid connection of said second pump means, remote from both said generator means and said absorber means, and a differential pressure diaphragm valve control mechanism operably associated with said valve and connected with one of said generator and absorber means for operating said valve as a function of the level of solution in the means to which it is connected.

20. In an absorption-type heat transfer apparatus, an absorber having a spent refrigerant inlet, an evaporator having an inlet for receiving condensed refrigerant and a refrigerant vapor outlet connected to said spent refrigerant inlet, and means operable as a function of absorber pressure for transferring unevaporated condensed refrigerant to said absorber.

21. In an absorption-type heat transfer apparatus, an absorber having a spent refrigerant inlet, a flooded evaporator having an inlet for receiving condensed refrigerant, a condensed refrigerant outlet and a refrigerant vapor outlet connected to said spent refrigerant inlet, a valve in the connection between said refrigerant vapor outlet and spent refrigerant inlet and responsive to absorber pressure to close as the absorber pressure falls below a predetermined point, and a connection between said condensed refrigerant outlet and said absorber to transfer condensed refrigerant from said evaporator to said absorber when said valve is closed.

22. An absorption-type heat transfer apparatus of the type described in claim 21, wherein said evaporator is housed in a main cooling chamber and the connection between said condensed refrigerant outlet and said absorber includes an auxiliary evaporator outside the main cooling chamber.

References Cited in the file of this patent
UNITED STATES PATENTS

| | | |
|---|---|---|
| 1,105,171 | Zander | July 28, 1914 |
| 1,134,269 | Hiester | Apr. 6, 1915 |
| 1,342,403 | Baxter | June 1, 1920 |
| 1,427,379 | Hapgood | Aug. 29, 1922 |
| 1,788,114 | Liljenroth | Jan. 6, 1931 |
| 2,037,782 | Hainsworth | Apr. 21, 1936 |
| 2,203,207 | Smith | June 4, 1940 |
| 2,232,449 | Habenicht | Feb. 18, 1941 |
| 2,237,302 | Flukes | Apr. 8, 1941 |
| 2,319,601 | Hedlund | May 18, 1943 |
| 2,408,802 | Miller | Oct. 8, 1946 |
| 2,480,497 | Meyer | Aug. 30, 1949 |
| 2,502,104 | Reid | Mar. 28, 1950 |
| 2,550,429 | Reid | Apr. 24, 1951 |
| 2,653,454 | Buchel | Sept. 29, 1953 |
| 2,658,485 | Dreyer | Nov. 10, 1953 |

FOREIGN PATENTS

| | | |
|---|---|---|
| 665,752 | Great Britain | Jan. 30, 1952 |